(12) United States Patent
Woodworth et al.

(10) Patent No.: US 12,091,173 B2
(45) Date of Patent: Sep. 17, 2024

(54) UAV WITH DISTRIBUTED PROPULSION AND BLOWN CONTROL SURFACES

(71) Applicant: WING Aviation LLC, Mountain View, CA (US)

(72) Inventors: Adam Woodworth, San Jose, CA (US); Giulia Pantalone, Redwood City, CA (US); Michelle Suen, Sunnyvale, CA (US); Luis Prado, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 53 days.

(21) Appl. No.: 17/957,679

(22) Filed: Sep. 30, 2022

(65) Prior Publication Data

US 2024/0109657 A1 Apr. 4, 2024

(51) Int. Cl.
*B64C 39/02* (2023.01)
*B64C 1/12* (2006.01)
(Continued)

(52) U.S. Cl.
CPC .............. *B64C 39/024* (2013.01); *B64C 1/12* (2013.01); *B64C 5/02* (2013.01); *B64C 11/20* (2013.01);
(Continued)

(58) Field of Classification Search
CPC ........... B64C 39/024; B64C 1/12; B64C 5/02; B64C 11/20; B64C 27/26; B64U 10/25; B64U 30/10; B64U 30/20; B64U 2101/60
See application file for complete search history.

(56) References Cited

U.S. PATENT DOCUMENTS

| 1,987,788 A | * | 1/1935 | Morton | .................... B64C 39/08 244/56 |
| 3,181,810 A | * | 5/1965 | Olson | .................. B64C 29/0033 244/66 |

(Continued)

FOREIGN PATENT DOCUMENTS

| CN | 106904271 A | 6/2017 |
| CN | 111846215 A | 10/2020 |
| EP | 3636546 A1 | 4/2020 |

OTHER PUBLICATIONS

International Search Report and Written Opinion mailed Dec. 4, 2023, in corresponding International Patent Application PCT/US2023/030346, 13 pages.

(Continued)

*Primary Examiner* — Medhat Badawi
(74) *Attorney, Agent, or Firm* — Christensen O'Connor Johnson Kindness PLLC (57) ABSTRACT

An unmanned aerial vehicle (UAV) includes a fuselage, a pair of fixed wings attached to the fuselage, a tail assembly attached to an aft portion of the fuselage and including a pair of stabilizers, a plurality of distributed propulsion units having first propellers that rotate about first rotational axes positioned below the fixed wings, and a plurality of tail propulsion units having second propellers that rotate about second rotational axes each positioned inline with one of the stabilizers. The first propellers are mounted fore of the fixed wings and the second propellers are mounted fore of a corresponding one of the stabilizers. Three or more of the distributed propulsion units are mounted to each of the fixed wings.

23 Claims, 10 Drawing Sheets

(51) Int. Cl.
  *B64C 5/02* (2006.01)
  *B64C 11/20* (2006.01)
  *B64U 10/25* (2023.01)
  *B64U 30/10* (2023.01)
  *B64U 30/20* (2023.01)
  *B64U 101/60* (2023.01)

(52) U.S. Cl.
  CPC .............. *B64U 10/25* (2023.01); *B64U 30/10* (2023.01); *B64U 30/20* (2023.01); *B64U 2101/60* (2023.01)

(56) References Cited

U.S. PATENT DOCUMENTS

| | | | | | |
|---|---|---|---|---|---|
| 4,828,203 | A | * | 5/1989 | Clifton | B64C 29/0033 244/12.3 |
| 5,374,010 | A | * | 12/1994 | Stone | B64C 29/0025 244/45 R |
| 6,550,717 | B2 | * | 4/2003 | MacCready | B64C 39/10 244/45 R |
| D476,289 | S | * | 6/2003 | Kendall | D12/319 |
| 7,281,681 | B2 | * | 10/2007 | MacCready | B64U 50/32 244/59 |
| 8,011,616 | B2 | * | 9/2011 | MacCready | B64U 30/40 244/58 |
| 8,800,912 | B2 | * | 8/2014 | Oliver | B64D 27/06 244/66 |
| 9,481,457 | B2 | * | 11/2016 | Alber | B64U 10/20 |
| 9,834,305 | B2 | * | 12/2017 | Taylor | B64C 27/26 |
| 9,950,801 | B2 | * | 4/2018 | Viala | B64D 27/02 |
| 9,975,631 | B1 | * | 5/2018 | McLaren | B64C 11/46 |
| 10,099,793 | B2 | | 10/2018 | Ullman et al. | |
| 10,137,983 | B2 | * | 11/2018 | Horn | B64U 10/20 |
| 10,144,509 | B2 | * | 12/2018 | Cruz Ayoroa | B64C 29/0033 |
| 10,315,761 | B2 | * | 6/2019 | McCullough | B64C 39/02 |
| 10,343,774 | B2 | * | 7/2019 | Duque | B64C 39/024 |
| 10,384,773 | B2 | * | 8/2019 | Vondrell | B64D 27/24 |
| 10,625,852 | B2 | * | 4/2020 | Bevirt | B64C 29/0033 |
| 10,633,092 | B2 | | 4/2020 | Willford | |
| 10,850,835 | B2 | * | 12/2020 | Hutson | B64C 29/0016 |
| 10,926,874 | B2 | * | 2/2021 | Giannini | B64U 50/14 |
| 11,305,869 | B1 | | 4/2022 | Ward | |
| 11,383,849 | B2 | * | 7/2022 | David | B64C 39/08 |
| 11,435,762 | B1 | * | 9/2022 | Auerbach | B64C 29/0025 |
| 11,440,678 | B1 | * | 9/2022 | Wiegman | B64D 45/04 |
| 11,472,546 | B2 | * | 10/2022 | Tao | B64C 23/02 |
| 11,492,099 | B2 | * | 11/2022 | Cummings | B64D 27/16 |
| 11,634,212 | B1 | * | 4/2023 | Giannini | B64D 29/02 244/7 C |
| 11,634,232 | B1 | * | 4/2023 | Wiegman | B64C 29/0016 244/53 R |
| 11,643,207 | B1 | * | 5/2023 | Ross | B64U 70/50 244/3 |
| 11,726,479 | B2 | * | 8/2023 | Norcia | B64U 50/13 244/13 |
| 11,780,573 | B2 | * | 10/2023 | Mikic | B64C 29/0016 244/6 |
| 11,891,164 | B1 | | 2/2024 | Woodworth et al. | |
| 2002/0070313 | A1 | * | 6/2002 | MacCready | B64C 39/024 244/5 |
| 2003/0141409 | A1 | * | 7/2003 | Lisoski | B64U 50/31 244/13 |
| 2004/0118969 | A1 | | 6/2004 | MacCready et al. | |
| 2009/0294573 | A1 | | 12/2009 | Wilson et al. | |
| 2010/0230547 | A1 | * | 9/2010 | Tayman | B64U 30/21 244/7 C |
| 2011/0303795 | A1 | * | 12/2011 | Oliver | B64C 29/0033 244/7 R |
| 2011/0315809 | A1 | * | 12/2011 | Oliver | B64C 39/08 244/12.4 |
| 2016/0144957 | A1 | * | 5/2016 | Claridge | B64U 10/20 244/6 |
| 2016/0144969 | A1 | * | 5/2016 | Rawdon | B64U 50/31 244/199.4 |
| 2017/0057631 | A1 | * | 3/2017 | Fredericks | B64C 25/52 |
| 2017/0197719 | A1 | * | 7/2017 | Kwon | B64F 1/12 |
| 2017/0320570 | A1 | * | 11/2017 | Horn | B64U 10/20 |
| 2017/0349281 | A1 | * | 12/2017 | Quinlan | B64D 5/00 |
| 2018/0002011 | A1 | * | 1/2018 | McCullough | B64C 27/26 |
| 2018/0002012 | A1 | * | 1/2018 | McCullough | B64U 70/80 |
| 2018/0002013 | A1 | * | 1/2018 | McCullough | B64C 29/02 |
| 2018/0002015 | A1 | * | 1/2018 | McCullough | B64D 1/08 |
| 2018/0086448 | A1 | * | 3/2018 | Kroo | B64C 29/0033 |
| 2018/0186464 | A1 | | 7/2018 | Woodworth et al. | |
| 2019/0023390 | A1 | * | 1/2019 | Murrow | B64D 27/31 |
| 2019/0031335 | A1 | * | 1/2019 | McCullough | B64C 39/08 |
| 2019/0161185 | A1 | * | 5/2019 | Woodworth | B64C 39/024 |
| 2019/0176958 | A1 | * | 6/2019 | Woodworth | B29C 45/0053 |
| 2019/0185149 | A1 | * | 6/2019 | Pantalone | B64C 27/14 |
| 2019/0193855 | A1 | * | 6/2019 | Prager | B64U 10/10 |
| 2019/0193856 | A1 | * | 6/2019 | Prager | B66D 1/12 |
| 2019/0329857 | A1 | * | 10/2019 | Benson | B64C 1/061 |
| 2019/0329877 | A1 | | 10/2019 | Benson et al. | |
| 2020/0156803 | A1 | * | 5/2020 | Kooiman | B64C 39/024 |
| 2021/0096562 | A1 | * | 4/2021 | Ruckel | B64C 29/0033 |
| 2021/0107620 | A1 | | 4/2021 | Weekes et al. | |
| 2021/0276704 | A1 | | 9/2021 | Pantalone et al. | |
| 2022/0097812 | A1 | * | 3/2022 | Zweiri | B64C 29/02 |
| 2022/0234745 | A1 | | 7/2022 | Abramov et al. | |
| 2022/0250762 | A1 | * | 8/2022 | Sperrin | B60L 50/72 |
| 2023/0112766 | A1 | * | 4/2023 | Norcia | B64D 1/18 701/3 |

OTHER PUBLICATIONS

Blown Flap, Wikipedia Article, https://en.wikipedia.org/w/index.php?title=Blown_flap&oldid=1092739544, Jun. 12, 2022, 5 pages.
Courtin et al., A Performance Comparison of Estol and Evtol Aircraft, MIT International Center for Air Transportation (ICAT), Report No. ICAT-2021-02, Aug. 2021, 29 pages.
Stoll, NASA Remakes the Airplane Wing with Electric Propulsion and a Whole Lot of Propellers, IEEE Spectrum, https://spectrum.ieee.org/amp/nasa-remakes-the-airplane-wing-with-electric-propulsion-and-a-whole-lot-of- propellers-2650277283, Jul. 24, 2018, 8 pages.
NASA X-57 Maxwell, Wikipedia Article, https://en.wikipedia.org/w/index.php?title=NASA_X-57_Maxwell&oldid=1104542313, Aug. 15, 2022, 6 pages.
What are the reasons behind this pusher propeller configuration? Aviation Stack Exchange, https://aviation.stackexchange.com/questions/39750/what-are-the-reasons-behind-this-pusher-propeller-configuration, downloaded from Internet on Aug. 19, 2022, 5 pages.
Would putting several small propellers on a wing be efficient? Aviation Stack Exchange, https://aviation.stackexchange.com/questions/53930/would-putting-several-small-propellers-on-a-wing-be-efficient, downloaded from Internet on Aug. 19, 2022, 2 pages.
What is 'Reverse Thrust' in Airplanes and How Does it Work ?. Blog-Monroe Aeropsace, https://monroeaerospace.com/blog/what-is-reverse-thrust-in-airplaces-and-how-does-it-work/#:~:text=Rather%2C Dec. 18, 2018, 2 pages.
Agrawal et al., Wind Tunnel Testing of a Blown Flap Wing, American Institute of Aeronautics and Aeronautics, Inc., Jun. 18, 2019, 21 pages.
US Office Action mailed Sep. 22, 2023, in corresponding U.S. Appl. No. 17/957,750, 11 pages.

* cited by examiner

UAV WITH DISTRIBUTED PROPULSION AND BLOWN CONTROL SURFACES

CROSS-REFERENCE TO RELATED APPLICATIONS

The present application is related to U.S. application Ser. No. 17/957,750 entitled, "UAV With Distributed Propulsion For Short Takeoffs And Landings," filed on Sep. 30, 2022, the same day as the present application.

TECHNICAL FIELD

This disclosure relates generally to unmanned aerial vehicles (UAVs), and in particular but not exclusively, relates to short takeoff and landing (STOL) UAVs for package deliveries.

BACKGROUND INFORMATION

An unmanned vehicle, which may also be referred to as an autonomous vehicle, is a vehicle capable of travel without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions. One type of unmanned aerial vehicle (UAV) is a vertical takeoff and landing (VTOL) UAV. VTOL UAVs are currently deployed in limited use for package delivery missions. The VTOL capability enables a UAV to pick up packages from almost anywhere and deliver them to almost anywhere. Additionally, VTOL enables a low-touch, scalable delivery operation because the aircrafts are able to perform pre-flight functional checks, takeoff and land within a small footprint, and charge their batteries without human intervention or expensive, bulky ground support equipment that requires significant operator training and real estate.

Unfortunately, VTOL capability significantly limits the range of electric aircraft (compared to a similarly sized fixed wing aircraft) due to the amount of power required to hover and the significant fraction of aircraft mass dedicated to the hover propulsion system. For example, 12 seconds of hover time may be worth 1 km of cruise range. This is because the aircraft must produce enough thrust to support its entire weight while hovering, whereas in cruising flight only enough thrust to balance the force of aerodynamic drag—typically 5-10 times less than the vehicle's weight—is needed. Hover power scales proportionately with thrust to the 3/2 power and inversely with the square root of total rotor disk area. As such, range depends strongly on both the maximum gross weight (MGW) of the aircraft and its overall dimensions, or ground footprint.

When considering UAV configurations suitable for aerial delivery of heavier payloads over longer distances, it may be beneficial to relax—or even eliminate—the VTOL requirement to minimize energy consumption in takeoff, landing, and delivery and to reduce propulsion system weight. That said, it is still desirable to minimize the real estate and ground support infrastructure required to operate non-VTOL UAVs. Accordingly, a fixed-wing UAV designed for longer distance flight carrying heavier payloads while having a short take-off and landing (STOL) capability may be desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for a fixed-wing unmanned aerial vehicle (UAV) designed for short takeoffs and landings (STOL), as well as, low speed flight during package drop-offs of a package delivery mission are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word "short" in the acronym short takeoff and landing (STOL) is relative, and an aircraft is considered "STOL" if it is designed to take off and land in a shorter distance than an aircraft with conventional propulsion systems and otherwise similar range and payload capacity. STOL capability is not without drawbacks. In order to reduce the amount of runway required for a conventional fixed-wing airplane to take-off and land it may be necessary to increase the propulsion system maximum power and/or reduce the stall speed of the wing (e.g., increase the amount of lift that can be generated at low airspeeds). Increasing propulsion power typically comes at the cost of increased propulsion system weight. Stall speed can be reduced by increasing the size of the wing and adding "high lift devices," such as trailing edge flaps, to increase the wing camber and therefore its lifting capability. Both of these approaches increase structural weight. Increasing wing size reduces aerodynamic efficiency during cruise. Increased structural weight and reduced cruise efficiency result in an overall larger aircraft for a given range and payload requirement.

Distributed electric propulsion can be used to replace a single propulsion unit (motor and propeller) or two propulsion units—as might be used in a conventional airplane—with many, smaller propulsion units along the span of the wing with zero or negligible increase in total propulsion system weight. The propulsion units produce thrust by moving air rearward at higher speed than the speed of the aircraft moving through the air. Lift generated by a wing is proportional to the local speed of airflow over the wing, so the increased flow speed due to the propulsion units has the useful side effect of increasing the lift generated by the wing at a given vehicle speed. This concept is referred to as a "blown wing." Additionally, when combined with trailing edge flaps, blown wings can generate 5× to 10× more lift than the unblown configuration, allowing the wing to be sized for the cruise operating condition, reducing size, structural weight, and increasing cruise efficiency. Battery-electric STOL aircraft employing blown flaps have the potential to carry 1.9 to 2.2 times the payload of a battery-electric VTOL aircraft for the same MGW, range, speed, and ground footprint. Equivalently, a STOL aircraft designed for a fixed payload and range can be lighter and smaller than a VTOL aircraft designed for the same requirements.

The above-mentioned benefits of a blown wing configuration can also be applied to control surfaces on the tail assembly of a UAV. The higher-speed airflow across the stabilizers (including rudder or elevators) of a tail assembly can also increase low speed lift and control authority versus an unblown configuration. This increased control authority is applicable to a variety of tail assembly configurations including V-tails, H-tails, or T-tails, in which stabilizers are oriented at different angles and positions with respect to the main fixed-wing and fuselage of the UAV. Again, the blown wings and control surfaces enable lower airspeed operation while providing the necessary lift and control authority. In turn, takeoffs and landings can be shorter due to the lower airspeed operation.

Figure 1A:
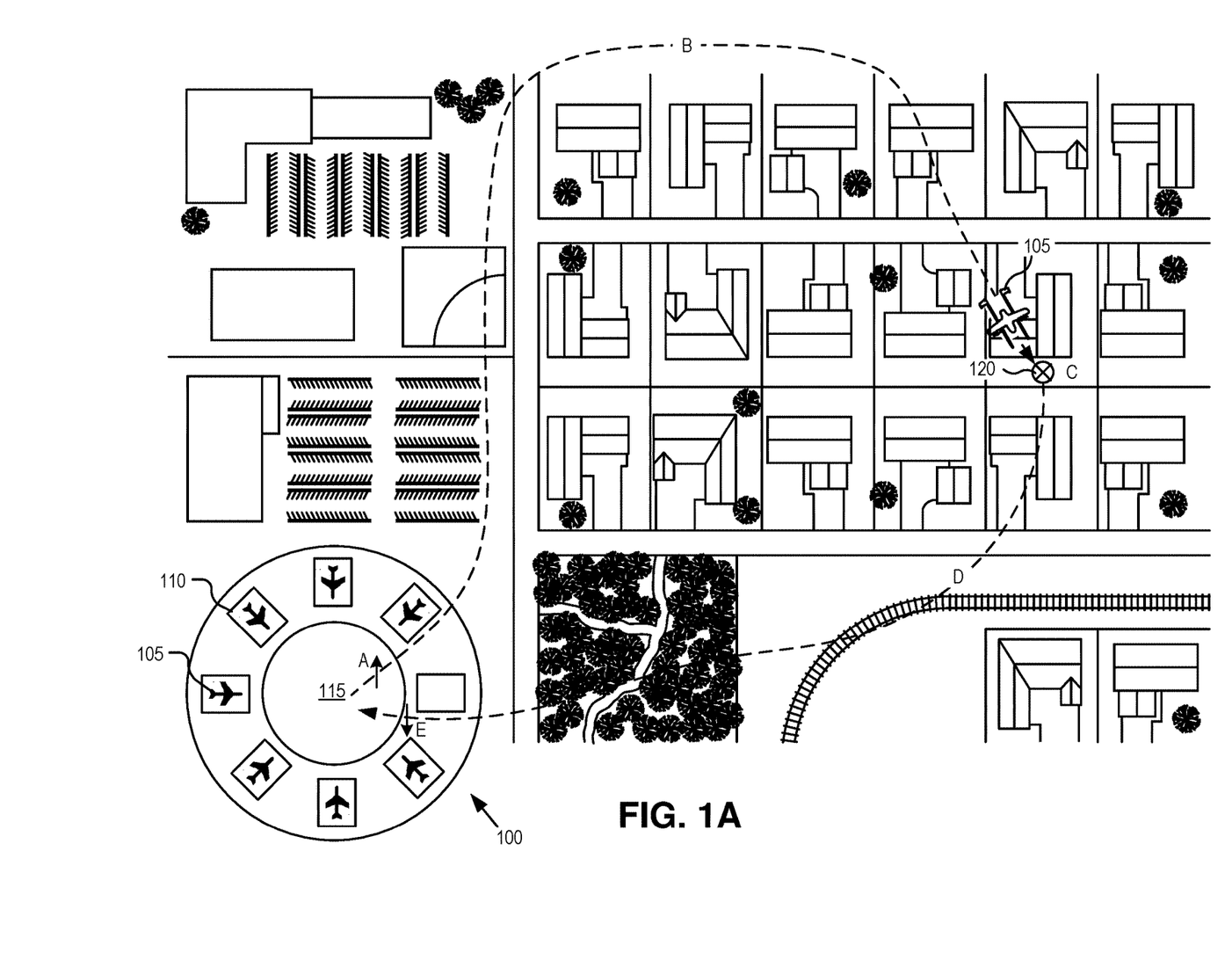
FIG. 1A illustrates a package delivery mission staged from a terminal area and executed by short takeoff and landing (STOL) unmanned aerial vehicles (UAV), in accordance with an embodiment of the disclosure.

UAVs may be provisioned to perform a variety of different mission types, including package delivery, aerial photography, public safety, etc. These UAVs may stage from an operations facility close to the neighborhood being served by a fleet of UAVs. FIG. 1A illustrates an example terminal area 100 staging a plurality of STOL UAVs, such as UAVs 105, that provide a package delivery service to a nearby neighborhood. In the illustrated embodiment, UAVs 105 are staged on charging pads 110 that ring a circular runway area 115.

Each package delivery mission includes a number of segments include a takeoff segment A, a cruise segment B, a package drop-off segment C, a return cruise segment D, and a landing segment E. Take-off segment A includes taxiing along the runway area 115 under high thrust and the initial stages of flight until clearing the perimeter fence of the terminal area 100 while carrying the payload and climbing to cruise altitude. Cruise segment B includes the cruise time to the destination 120 while carrying the package payload. The cruise segment is a higher speed mode of operation than the other segments. This higher speed provides adequate lift and control authority without the need of actively blowing the lift and control surfaces or deploying high-lift devices that increase drag. Drop-off segment C includes the flight time surrounding the package drop-off when UAV 105 slows its airspeed relative to its cruise speed and descends to a lower altitude for package deployment. During the drop-off segment, distributed and/or tail propulsion systems are powered to provide sufficient lift and/or control authority during the lower airspeeds. Correspondingly, the lower airspeeds facilitate a more precise deployment and drop of the package. Cruise segment D includes the cruise time from the destination 120 after dropping off the package and resuming the higher airspeed associated with regular forward cruise until reaching the vicinity of terminal area 100. Landing segment E includes the slower airspeed associated with an approach into runway area 115, touchdown, and the subsequent deceleration and ground roll after touchdown.

Figure 1B:
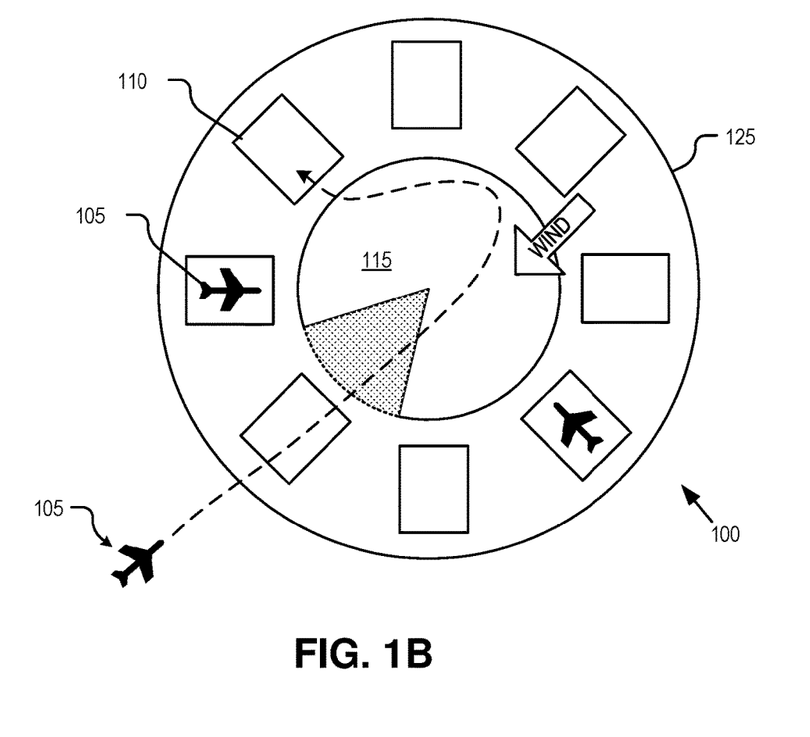
FIG. 1B illustrates a terminal area having a circular runway area for use with STOL UAVs, in accordance with an embodiment of the disclosure.

FIG. 1B illustrates greater detail of terminal area 100 having a circular runway area 115 for use with UAVs 105, in accordance with an embodiment of the disclosure. As illustrated, terminal area 100 includes charging pads 110 arrayed around the perimeter of circular runway area 115 for charging UAVs 105 while the outer perimeter 125 may be lined with a security fence or wall. In one embodiment, circular runway area 115 has a diameter of approximately 90 ft while outer perimeter 125 has a diameter D1 of 100 ft and the perimeter fence/wall has a height H1 of 8 ft (see FIG. 1C). Of course, other dimensions may be implemented.

Figure 1C:
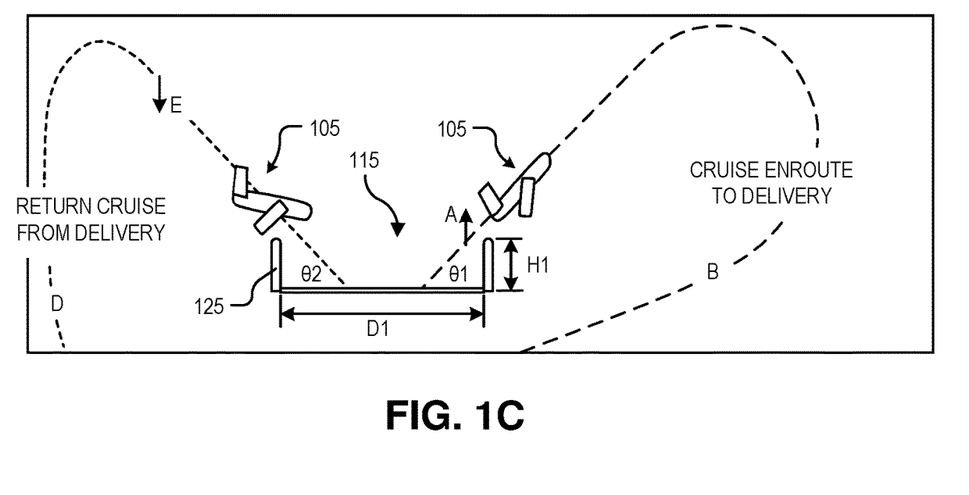
FIG. 1C illustrates landing and takeoff segments of a package delivery mission executed by a STOL UAV, in accordance with an embodiment of the disclosure.

The STOL characteristics of UAVs 105 facilitate the circular shape of runway area 125 within a reasonable sized footprint. In turn, the circular shape of runway area 125 enables UAVs 105 to approach and depart from any direction. This flexibility permits UAVs 105 to approach and depart into the wind (within a feasible approach/departure wedge) thereby reducing issues associated with crosswinds and maintaining short takeoff and landing distances. FIG. 1C illustrates how the blown surfaces of UAV 105 facilitate slow and steep landings (arrivals) and takeoffs (departures).

In some embodiments, departure paths having a climb angle ϵ1 of 50 degrees and arrival paths having an approach angle θ2 of 18 degrees are possible. The combination of the distributed propulsion and tail propulsion units described below increase the velocity of airflow over the main and tail lifting surfaces, including their control surfaces. This configuration provides increased lift and improved control authority, thereby enabling slower takeoff and landing speeds, higher climb angles, and higher sink-rates than conventional fixed-wing aircraft.

Figure 1D:
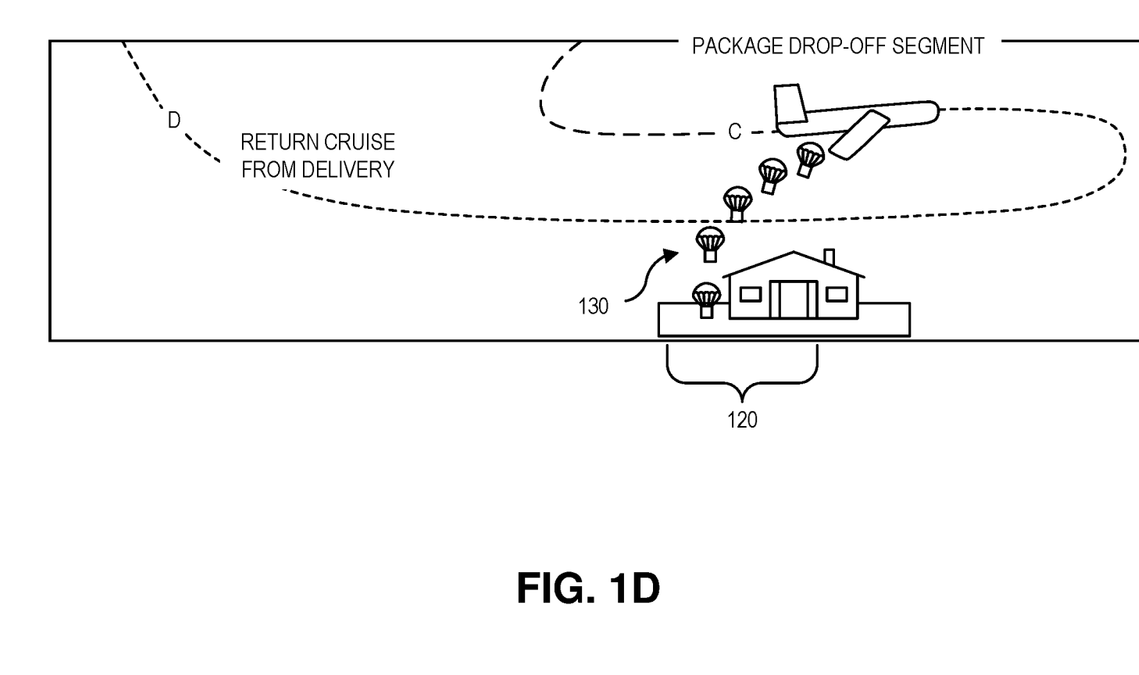
FIG. 1D illustrates a drop-off segment of a package delivery mission executed by a STOL UAV, in accordance with an embodiment of the disclosure.

FIG. 1D illustrates a drop-off segment C of a package delivery mission executed by a UAV 105 outfitted with distributed propulsion units and blown control surfaces, in accordance with an embodiment of the disclosure. The distributed propulsion units and blown control surfaces enable slower airspeeds and thus more time while passing over the drop zone at destination 120 to obtain a more precise drop-off of package 130. In the illustrated embodiment, package 130 is dropped from low altitude using a parachute.

Figure 2A:
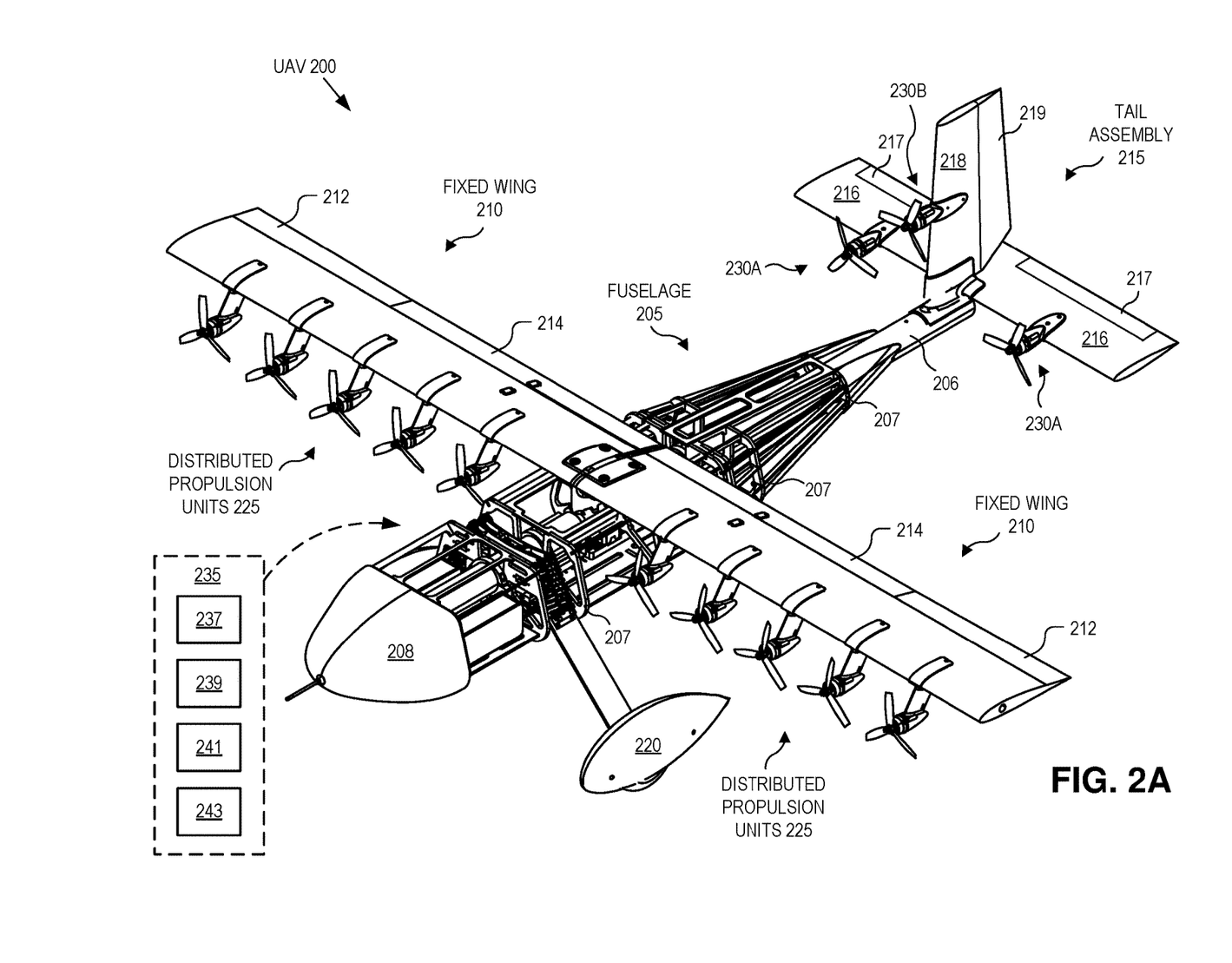
FIG. 2A is a perspective view illustration of a UAV with distributed propulsion units and blown control surfaces, in accordance with an embodiment of the disclosure.
Figure 2B:
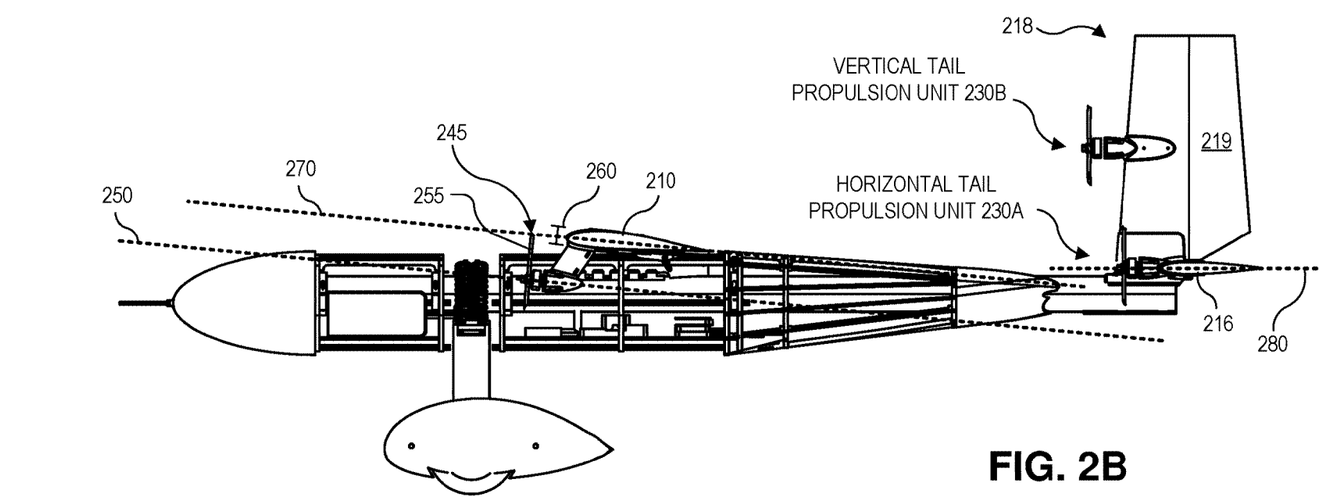
FIG. 2B is a side view illustration of a UAV with distributed propulsion units and blown control surfaces, in accordance with an embodiment of the disclosure.
Figure 2C:
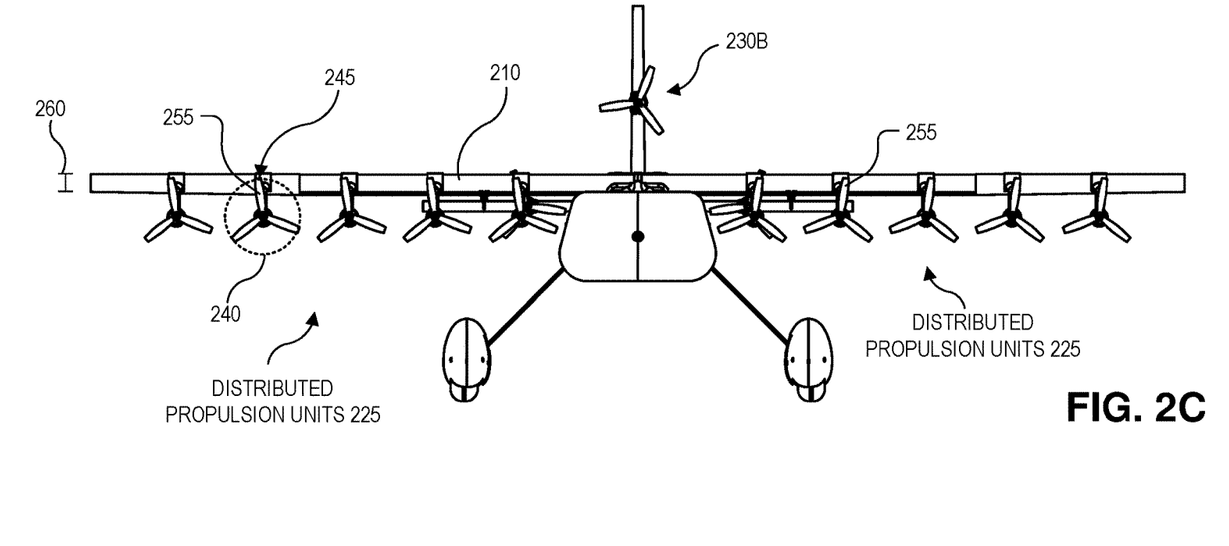
FIG. 2C is a front view illustration of a UAV with distributed propulsion units and blown control surfaces, in accordance with an embodiment of the disclosure.

FIGS. 2A-C illustrate a UAV 200 with distributed propulsion units and blown control surfaces to provide STOL characteristics, in accordance with an embodiment of the disclosure. UAV 200 is one possible implementation of UAVs 105. FIG. 2A is a perspective view illustration of UAV 200, FIG. 2B is a side view illustration, and FIG. 2C is a front view illustration of the same. The illustrated embodiment of UAV 200 includes a fuselage 205, a pair of fixed wings 210, a tail assembly 215, landing gear 220, distributed propulsion units 225, tail propulsion units 230A and 230B (collectively 230), and on-board circuitry 235. The illustrated embodiment of fuselage 205 includes a central structural tube 206, bulkhead ribs 207, and a fuselage skin 208 (only the nose cone portion is illustrated in FIG. 2A). The illustrated embodiment of fixed wings 210 have an aerodynamic shape to provide lift and each include ailerons 212 and flaps 214. The illustrated embodiment of tail assembly 215 includes horizontal stabilizers 216 having elevators 217 and a vertical stabilizer 218 having a rudder 219. The illustrated embodiment of on-board circuitry 235 includes a controller 237, a battery unit 239, sensors 241, and communication circuitry 243.

UAV 200 is a STOL aircraft adapted for package delivery missions. UAV 200 is a fixed wing targeting a larger payload capacity and extended range over a VTOL UAV of similar size and weight. Distributed propulsion units 225 mounted to and extend below fixed wings 210 with their propeller blades positioned fore of the leading edge of fixed wings 210. Distributed propulsion units 225 provide augmented lift at low airspeeds. Tail propulsion units 230 are mounted to tail assembly 215 inline with their corresponding stabilizers. Tail propulsion units 230 provide increased control authority at low airspeeds also by blowing air across the control surfaces (e.g., elevators 217 and rudder 219). Tail propulsion units 230A are mounted to horizontal stabilizers 216 and may also provide augmented lift, in addition to, increased control authority.

The STOL design concepts of UAV 200 generate enough lift at low airspeeds to maintain controlled flight down to airspeeds as low as 10 m/s or less. This is achieved using high lift devices on the fixed wings such as flaps 214. An aircraft's ability to generate lift is represented by a dimensionless parameter called the coefficient of lift, or CL. The wing's maximum coefficient of lift, or CL-MAX, represents the maximum possible amount of lift fixed wings 210 can generate at a specific operating point, which can be increased with flap deflection to some extent. For UAV 200, CL-MAX can be increased even further by using distributed propulsion units 225 on fixed wings 210, which "blow" across the flaps 214 increasing the local airflow there, and in effect increasing the lift generated by the downward deflected flaps. The total amount of lift generated by this system is characterized by CL-MAX-FAPS and the additional lift allows UAV 200 to land slower and therefore reduce the touchdown run distance, which reduces the overall size of terminal area 100. An example ground rolling distance during takeoff (i.e., standstill to landing gear liftoff) is approximately 35 ft while the distance to reach an altitude of 8 ft at takeoff (i.e., clearing a perimeter fence of terminal area 100) is approximately 47 ft. Of course, these numbers are mere examples and may be adjusted based upon a number of factors.

In the illustrated embodiment, each fixed wing 210 includes five distributed propulsion units 225 mounted thereto. In one embodiment, distributed propulsion units 225 are evenly distributed along fixed wings 210 to provide uniform blown air over the lift and control surfaces during flight. Of course, fewer or greater numbers of distributed propulsion units 225 may be mounted per fixed wing 225. For example, three or more distributed propulsion units 225 may be mounted per fixed wing 210.

Referring to FIGS. 2B and 2C, distributed propulsion units 225 are mounted to fixed wings 225 such that the rotational axes (e.g., one such axis 250 is illustrated in FIG. 2B) about which propellers 255 spin are positioned below fixed wings 210. In other words, propellers 255 are also mounted fore and below fixed wings 225. In one embodiment, this vertical offset is selected such that each propeller 255 traces out a circle 240 having an upper limit 245 that is inline with its corresponding fixed wing 210. Inline means that upper limit 245 of circle 240 falls within a thickness 260 of fixed wing 210. In some embodiments, this vertical offset may be selected such that the distal tips of propellers 255 align with a wing chord that extends from a leading edge to the trailing edge of fixed wing 210. FIG. 2B illustrates this distal tip alignment. Line 270 extends the wing chord of fixed wing 210 and passes through upper limit 245 of the circle 240 traced out by the distal tips of propeller 255.

FIG. 2B illustrates yet another example alignment between distributed propulsion units 225 and fixed wing 210. In the illustrated embodiment, rotational axis 250 is parallel to line 270, which extends the wing chord of fixed wing 210. This parallel configuration is referred to as a "zero cant" position where the rotational axes of distributed propulsion units 225 are parallel to the wing chord immediately above each distributed propulsion unit 225. Of course, other motor mounts that introduce positive or negative cant between distributed propulsion units 225 and the wing chord may be implemented. However, the above configuration of zero cant along with the propeller tips aligning with the wing chord at the apex of their spin arc is believed to provide STOL benefits to UAV 200.

Similar to distributed propulsion units 225, tail propulsion units 230 are mounted fore of their corresponding stabilizer. In contrast to distributed propulsion units 225, tail propulsion units 230 are mounted such that their rotational axes are inline with their corresponding stabilizers. In particular, horizontal tail propulsion units 230A are mounted inline with horizontal stabilizers 216 while vertical tail propulsion unit 230B is mounted inline with vertical stabilizer 218. This forward alignment enables tail propulsion units 230 to blow air over the control surfaces of their stabilizers regardless of the direction of deflection of the control surface. For example, FIG. 2B illustrates how the rotational axis 280 of horizontal tail propulsion unit 230A is inline with the wing chord (line extending from tip of the leading edge to tip of the trailing edge) through horizontal stabilizer 216.

To maximize airflow over elevators 217, horizontal tail propulsion units 230A are positioned in front of elevators 217. In some embodiments, horizontal tail propulsion units 230A are positioned directly in front of their relevant control/lift surfaces such that the distal tips of the propellers of horizontal tail propulsion units 230A either do not extend pass the lateral edges of elevators 217 or do not extend past the lateral tips of horizontal stabilizers 216. Similarly, to maximize airflow over rudder 219, the propeller tips of vertical tail propulsion unit 230B may not extend past the distal tip of vertical stabilizer 218 (or past rudder 219). In other words, the propellers of the tail propulsion units 230, and their corresponding propellers, may be positioned entirely in front of their relevant control surfaces when the blades are aligned parallel with the corresponding stabilizer. Of course, in other embodiments, propeller tips may extend past their corresponding control/lift surfaces in the spanwise direction.

Figure 3:
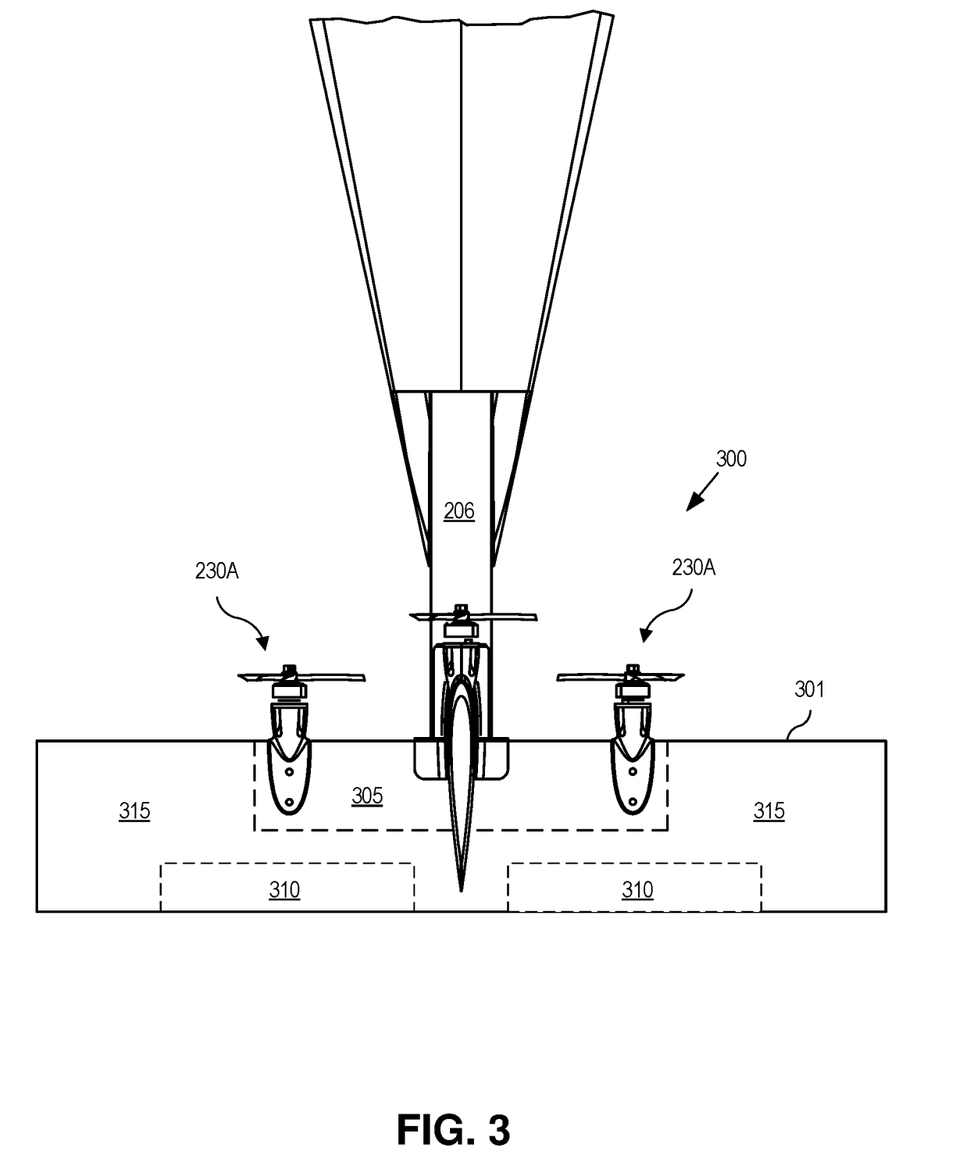
FIG. 3 illustrates a tail assembly of a UAV having stabilizers with blown control surfaces, in accordance with an embodiment of the disclosure.

FIG. 3 illustrates a plan view of a tail assembly 300 including a horizontal stabilizer 301, in accordance with embodiments of the disclosure. Tail assembly 300 illustrates possible implementations of tail assembly 215. In one embodiment, region 305 is a fixed region that does not pivot and provides a stationary, rigid mount to horizontal tail propulsion units 230A. During operation, horizontal tail propulsion units 230A blow air across the area directly behind horizontal tail propulsion units 230A. The elevators may be implemented by deflecting just regions 310 or by deflecting both regions 310 and the larger region 315. In the latter embodiment, the combination of regions 310 and 315 may be a contiguous member that pivots providing a larger overall control surface for increased control authority. In yet another embodiment, regions 305, 310, and 315 may represent a single contiguous member of horizontal stabilizer 301. In this embodiment, horizontal tail propulsion units 230A are effectively mounted directly to the elevator of horizontal stabilizer 301 thereby pivoting with the elevator and providing vertical thrust vectoring as well as blowing the control surface. Although FIGS. 2A, 2B, 2C, and 3 all illustrate a conventional tail, it should be appreciated that the principles of blown tail stabilizers are applicable to V-tail, H-tail, or other tail assembly configurations.

In the illustrated embodiment, the airframe of UAV 200 includes center structural tube 206 extending along a fore-to-aft longitudinal axis of UAV 200. Bulkhead ribs 207 are mounted to and encircle center structural tube 206 at a plurality of different locations along the fore-to-aft longitudinal axis. Bulkhead ribs 207 may define a number of different internal compartments. For example, in one embodiment, a fore compartment houses battery 239 while the mid and aft compartments house a payload bay for carrying and deploying package 130. Other electronics including controller 237, sensors 241, and communication circuitry 243 may be housed throughout one or more of these compartments. Of course, one or more of these components may span multiple compartments and be disposed in other locations. The internal components are protected by fuselage skin 208, which wraps around bulkhead ribs 207. Center structural tube 206 is the primary structural member of the aircraft, to which the other primary components mount. In the illustrated embodiment, tail assembly 215 mounts to an aft portion of center structural tube 206 while fixed wings 210 mount to a mid-section of center structural tube 206. Center structural tube 206 may be fabricated from a variety of rigid, lightweight materials such as aluminum, carbon fiber composite, or otherwise. In one embodiment, UAV 200 has a main wing span of approximately 1.8 m tip-to-tip across fixed wings 210, a wing area for both fixed wings 210 of approximately 0.38 $m^2$, a tail span of approximately 0.7 m tip-to-tip across horizontal stabilizers 216, a height of approximately 0.3 m for vertical stabilizer 218, and an overall tip-to-tail length along the fore-to-aft longitudinal axis of approximately 1.6 m. Of course, other dimensions may be implemented.

The landing gear 220 includes two large main wheels (illustrated) and a smaller tailwheel (not illustrated), each mounted to their own spring-damper systems. This landing gear configuration reduces the need for a change in pitch attitude during landing and facilitates steeper approach and departure angles.

Figure 5:
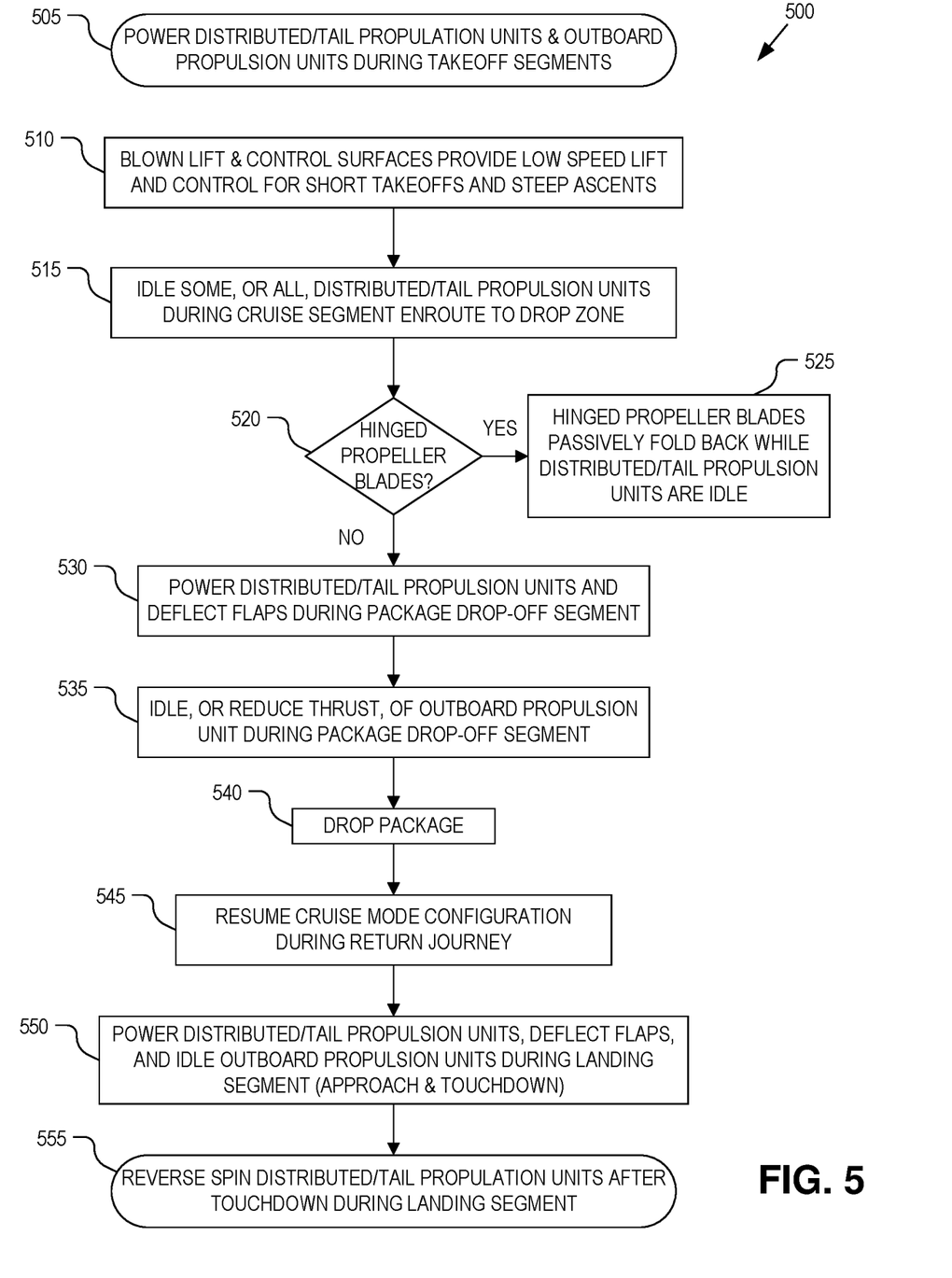
FIG. 5 is a flow chart illustrating operation of a STOL UAV throughout various segments of a package delivery mission, in accordance with an embodiment of the disclosure.

As mentioned, onboard circuitry 235 includes a controller 237. Controller 237 includes one or more processors coupled to memory that stores logic (e.g., software/firmware instructions) that when executed orchestrate the operation of the functional components and systems throughout UAV 200. For example, the logic for executing process 500 described below may be stored within the memory of controller 237. Controller 237 may be a centralized processing system or a distributed system including multiple processing units throughout UAV 200. These processing units may include electronic speed controllers (ESC) for governing the various propulsion units and avionics to perform navigation. Controller 237 is coupled to sensors 241 to inform flight control decisions and communication circuitry 243 to send or receive data and instructions.

Figure 4A:
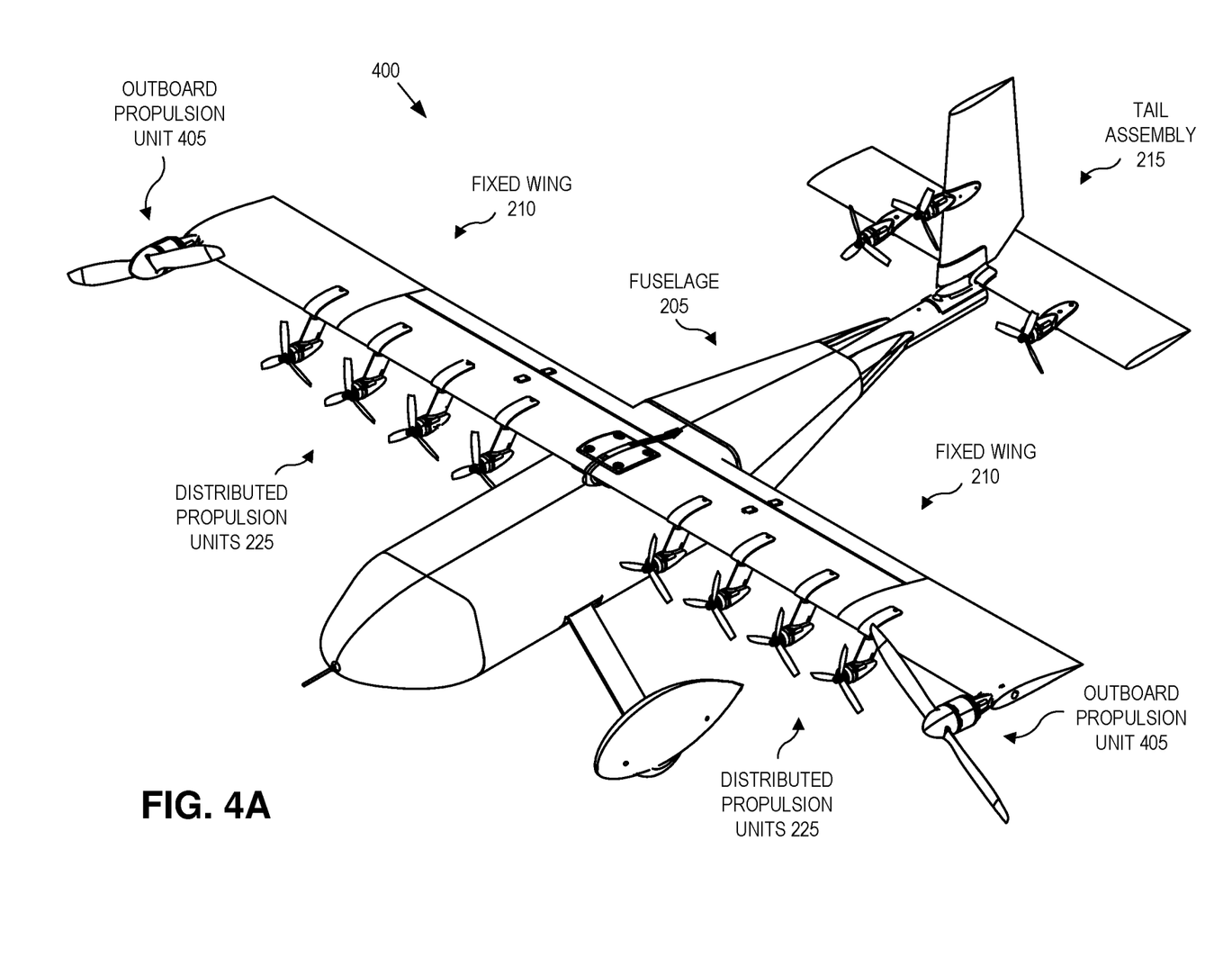
FIG. 4A is a perspective view illustration of a UAV with distributed propulsion units and larger outboard propulsion units, in accordance with an embodiment of the disclosure.
Figure 4B:
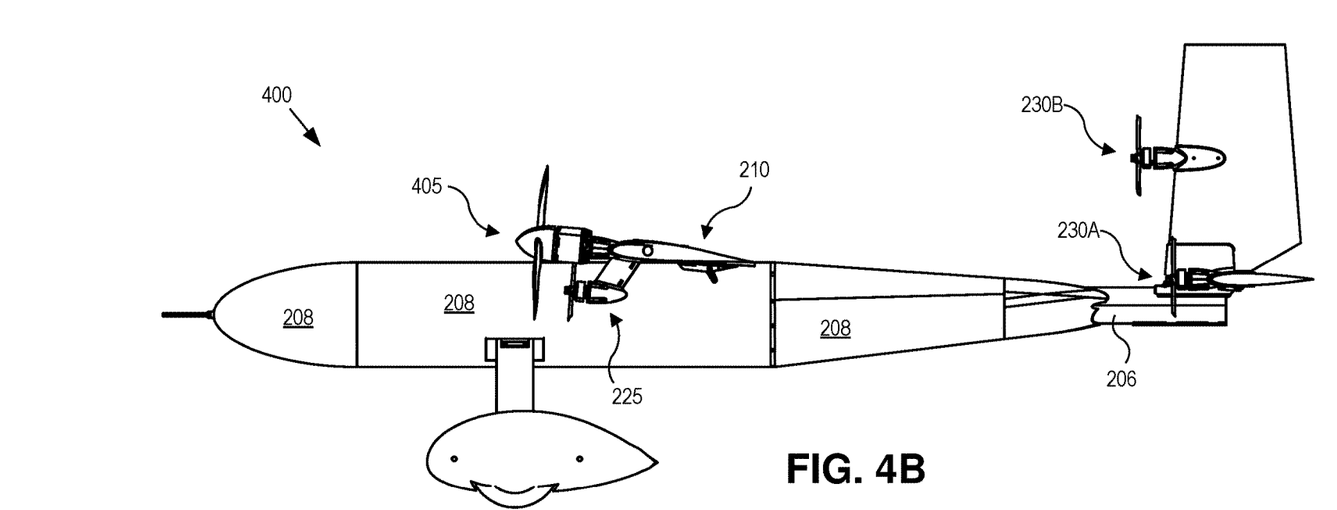
FIG. 4B is a side view illustration of a UAV with distributed propulsion units and larger outboard propulsion units, in accordance with an embodiment of the disclosure.
Figure 4C:
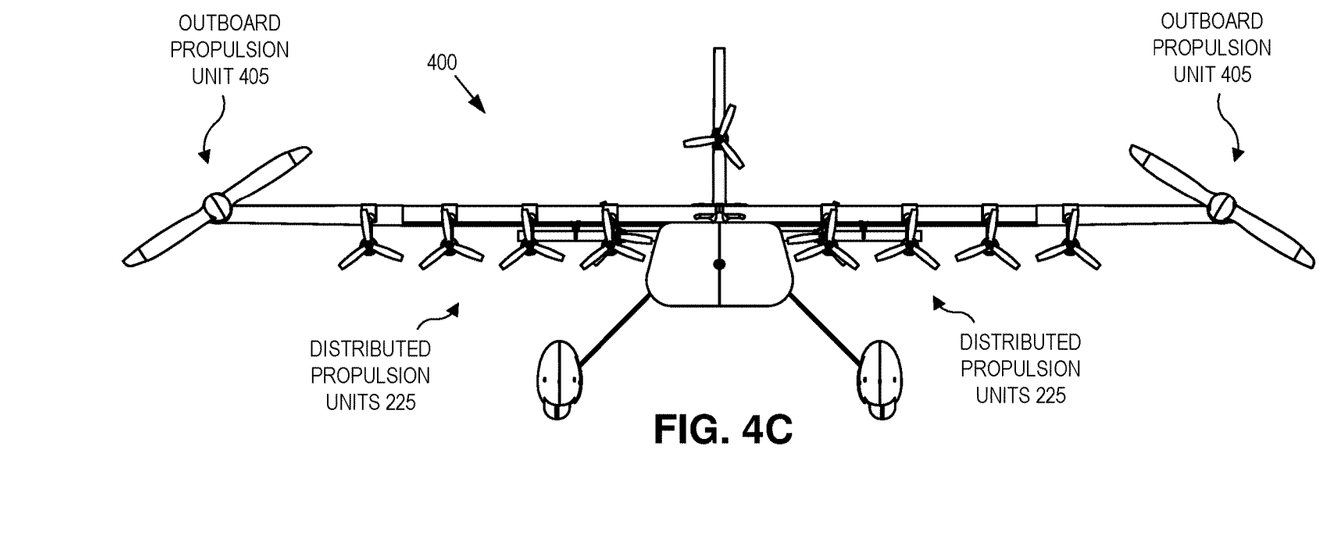
FIG. 4C is a front view illustration of a UAV with distributed propulsion units and larger outboard propulsion units, in accordance with an embodiment of the disclosure.

FIGS. 4A-C illustrates a UAV 400, in accordance with another STOL embodiment of the disclosure. FIG. 4A is a perspective view illustration of UAV 400, FIG. 4B is a side view illustration, and FIG. 4C is a front view illustration of the same. UAV 400 represents another possible implementation of UAV 105 and is similar to UAV 200 except that UAV 400 includes both distributed propulsion units 225 and larger outboard propulsion units 405. The illustrated embodiment of UAV 400 includes four distributed propulsion units 225 and one outboard propulsion unit 405 per fixed wing 210. Of course, UAV 400 may include more or less distributed propulsion units 225 per fixed wing 210 than illustrated.

Figure 4D:
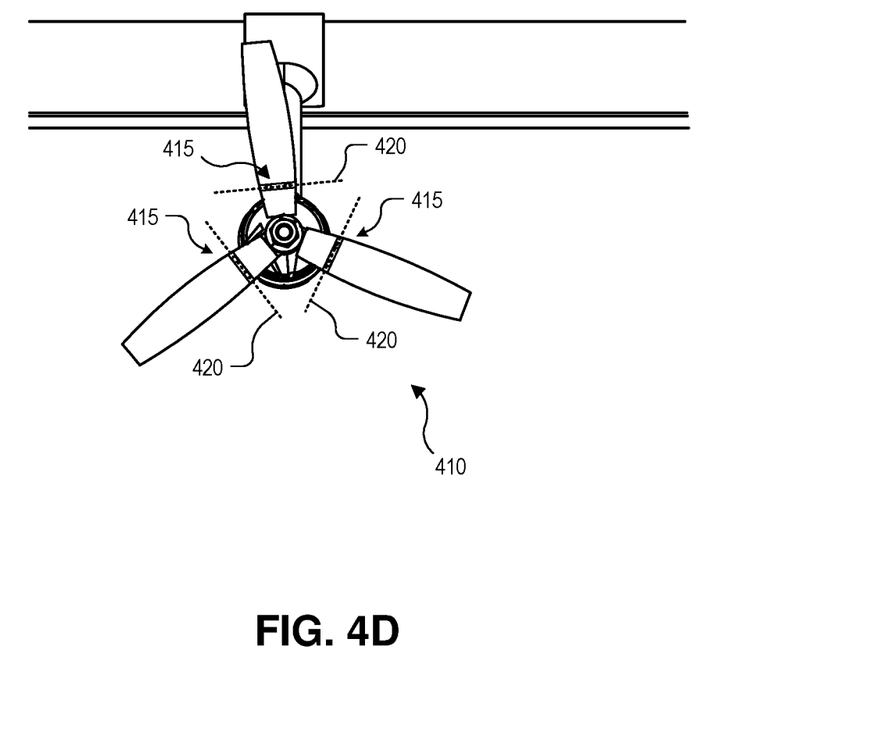
FIG. 4D illustrates a distributed propulsion unit having hinged propeller blades that passively fold back to reduce wing resistance during forward cruise, in accordance with an embodiment of the disclosure.

Outboard propulsion units 405 are mounted on fixed wings 210 outboard of distributed propulsion units 225. Outboard propulsion units 405 include propellers with larger diameters than those of distributed propulsion units 225. For example, the smaller propellers of distributed propulsion units 225 may be approximately 5 inches in diameter while the larger propellers of outboard propulsion units 405 may be 15 inches in diameter. The propellers of tail propulsion units 230 may have the same or even smaller diameters than those of distributed propulsion units 225. The larger propellers provide increased efficiency during the higher speed forward cruise flight segments between terminal area 100 and destination 120. For example, outboard propulsion units 405 may provide 85% efficiency at cruise speed (e.g., 25 m/s) while distributed propulsion units 225 in isolation may only provide 60% efficiency at the same cruise speed. During cruise segments where the forward airspeed is sufficiently high to provide adequate lift and control authority, distributed propulsion units 225 (and optionally tail propulsion units 230 as well) may be powered low or entirely idled to leverage the higher efficiency of outboard propulsion units 405. In some embodiments, the propeller blades of distributed propulsion units 225 and/or tail propulsion units 230 may be hinged to allow them to passively fold back to reduce wing resistance when some or all of these propulsion units are idled. Referring to FIG. 4D, distributed propulsion unit 410 includes hinges 415 disposed at the base of each propeller blade. When the propellers are spinning, centrifugal forces straighten the blades into their deployed position (illustrated). When the propeller is idled, wind resistance causes the propeller blades to passively fold back about axes 420, thereby reducing their overall drag when not used. It should be understood that only some of the distributed propulsion units 225 and/or tail propulsion units 230 may be periodically idled during different stages of a package delivery mission. As such, in various embodiments, only a portion of the propeller blades of these smaller propulsion units may be hinged. In other embodiments, all of these smaller propulsion units may include hinged propeller blades.

FIG. 5 is a flow chart illustrating a process 500 of operation of a STOL UAV, such as UAVs 105, 200, or 400, throughout the various segments of a package delivery mission, in accordance with an embodiment of the disclosure. Process 500 is specifically described in relation to UAV 400 including both outboard propulsion units 405 and distributed propulsion units 225; however, it should be apparent that much of process 500 is also applicable to the use and operation of UAV 200 without outboard propulsion units 405. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

Process 500 begins after UAV 105 has taxied off of its charging pad 110 and into an initial takeoff position on circular runway area 115. In a process block 505, all available propulsion units are powered for rapid acceleration and a high angle ascent. In the case of UAV 400, this includes powering distributed propulsion units 225, tail propulsion units 230, and outboard propulsion units 405. The distributed propulsion units 225 and tail propulsion units 230 provide additional blown air over the aerodynamic wings and control surfaces providing increased lift and control for the short takeoffs and steep ascents associated with takeoff segment A (process block 510).

Once UAV 105 levels out at its cruising height (e.g., 400 ft) and achieves cruising airspeed (e.g., 25 m/s), it transitions from the takeoff segment A to the cruise segment B and continues enroute to its delivery destination 120 (drop zone). During cruise segment B, UAV 400 may transition to a more efficient mode of operation that relies more heavily (or even exclusively) upon the higher efficiency of its outboard propulsion units 405. In such scenarios, all or some of its distributed propulsion units 225 and/or tail propulsion units 230 are idled (process block 515). If any of the idled distributed propulsion units 225 or tail propulsion units 230 have hinged propeller blades (decision block 520), the propellers of those idled propulsion units will passively fold back to reduce wind drag and increase overall cruise efficiency (process block 525).

Upon approach to the drop zone (destination 120), UAV 105 will descend to its drop height (e.g., 20 m) and slow to its package delivery speed (e.g., 10 m/s) in anticipation of entering package drop-off segment C. In a process block 530, upon transitioning from cruise segment B to package drop-off segment C, distributed propulsion units 225 and tail propulsion units 230 are powered while outboard propulsion units 405 are powered down or even idled (process block 535). UAV 200 may simply reduce thrust provided by distribution propulsion units 225 and deflect flaps to provide additional lift at lower airspeeds. In one embodiment, thrust from distribution propulsion units 225 may be biased towards the inboard distributed propulsion units 225 aligned directly in front of flaps 214 while comparatively reducing thrust to the outboard distribution propulsion units 225. This increases airflow over flaps 214 for a given airspeed providing increased lift at lower airspeeds. For UAV 400, the larger outboard propulsion units 405 may be slowed or entirely idled during package drop-off segment C. While flying at low altitude and slow airspeeds for increase drop accuracy, package 130 is dropped at destination 120 (process block 540).

After dropping package 130 at destination 120, UAV 105 resumes its cruise mode configuration for the return journey (return cruise segment D) back to terminal area 100 (process block 545). The cruise mode configuration may include returning to the same altitude, airspeed, propulsion unit, and flap configuration as used during cruise segment B.

Upon arriving in the vicinity of terminal area 100, UAV 105 configures for a slow, steep approach into terminal area 100 for landing segment E. In one embodiment, this landing configuration includes powering distributed propulsion units 225 and tail propulsion units 230, deflecting flaps 214, and slowing or idling outboard propulsion units 405 for UAV 400 (process block 550). In one embodiment, thrust provided by distributed propulsion units 225 is biased towards the inboard distribution propulsion units 225 that are aligned directly in front of flaps 214 such that the distributed propulsion units 225 aligned directly in front of flaps 214 generate comparatively more thrust than the distributed propulsion units 225 positioned outboard of flaps 214. This power distribution between distributed propulsion units 225 provides increased lift at lower airspeed for a short landing. Finally, in a process block 555, the propellers of one or more of distributed propulsion units 225 and/or tail propulsion units 230 are reverse spun after touchdown to reduce ground roll along circular runway area 115 during landing segment E.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV), comprising:
   a fuselage;
   a pair of fixed wings attached to the fuselage and each shaped to provide aerodynamic lift;
   a tail assembly attached to an aft portion of the fuselage and including stabilizers;
   a plurality of distributed propulsion units having first propellers that rotate about first rotational axes positioned below the fixed wings, wherein the first propellers are mounted fore of the fixed wings, and wherein three or more of the distributed propulsion units are mounted to each of the fixed wings; and
   a plurality of tail propulsion units having second propellers that rotate about second rotational axes each positioned inline with one of the stabilizers, wherein the second propellers are mounted fore of a corresponding one of the stabilizers,
   wherein distal tips of the first propellers of the distributed propulsion units trace out a circle having an upper limit that is inline with the fixed wings.

2. The UAV of claim 1, wherein the tail assembly includes a pair of horizontal stabilizers, and wherein the plurality of tail propulsion units includes horizontal tail propulsion units each mounted to a corresponding one of the horizontal stabilizers, wherein the second propellers of the horizontal tail propulsion units do not extend out horizontally past distal tips of the horizontal stabilizers.

3. The UAV of claim 2, wherein the horizontal tail propulsion units are each mounted in front of a corresponding elevator to blow air across the corresponding elevator.

4. The UAV of claim 2, wherein the horizontal tail propulsion units are mounted to elevators of the horizontal stabilizers and pivot with the elevators to provide a vertical thrust vectoring to the tail assembly.

5. The UAV of claim 1, wherein the plurality of distributed propulsion units comprises five distributed propulsion units mounted per one of the fixed wings.

6. The UAV of claim 1, further comprising:
   a pair of outboard propulsion units each mounted to a corresponding one of the fixed wings outboard of the distributed propulsion units, wherein the outboard propulsion units include outboard propellers having a larger diameter than the first propellers of the distributed propulsion units.

7. The UAV of claim 6, wherein the first propellers of at least a portion of the distributed propulsion units include hinged propeller blades that passively fold back to reduce a wind resistance when the portion of the distributed propulsion units is idled during a forward cruise of the UAV under power of the outboard propulsion units, wherein the first propellers are oriented to provide forward propulsion to the UAV.

8. The UAV of claim 1, wherein the distributed propulsion units include motor mounts that align the first propellers with a zero cant such that the first rotational axes are each parallel to a corresponding wing chord extending from a leading edge of a corresponding one of the fixed wings to a trailing edge of the corresponding one of the fixed wings.

9. The UAV of claim 1, wherein the fuselage comprises:
   a center structural tube extending along a fore-to-aft longitudinal axis of the UAV;
   bulkhead ribs mounted to and encircling the center structural tube at a plurality of different locations along the fore-to-aft longitudinal axis; and
   a fuselage skin disposed around the bulkhead ribs,
   wherein the fixed wings and the tail assembly are mounted to the center structural tube.

10. The UAV of claim 1, further comprising a controller coupled to the distributed propulsion units and the tail propulsion units, the controller including logic that when executed causes the UAV to perform operations comprising:
    reverse spinning at least a portion of the first propellers or the second propellers after a touchdown to reduce a ground roll distance during a landing of the UAV.

11. The UAV of claim 1, further comprising a controller coupled to the distributed propulsion units and the tail propulsion units, the controller including logic that when executed causes the UAV to perform operations comprising:
    biasing a greater thrust to each of the distributed propulsion units positioned in front of flaps of the fixed wings compared to each of the distributed propulsion units not positioned in front of the flaps during an approach to a landing.

12. The UAV of claim 1, further comprising a controller coupled to the distributed propulsion units and the tail propulsion units, the controller including logic that when executed causes the UAV to perform operations comprising:
    blowing air across tail control surfaces with the tail propulsion units during a landing segment and a drop-off segment of a package delivery mission of the UAV; and
    idling the tail propulsion units during a cruise segment of the package delivery mission.

13. An unmanned aerial vehicle (UAV), comprising:
    a fuselage including a center structural tube extending along a fore-to-aft longitudinal axis of the UAV;
    a pair of fixed wings mounted to the center structural tube and each shaped to provide aerodynamic lift;
    a tail assembly mounted to an aft portion of the center structural tube and including stabilizers;
    a plurality of distributed propulsion units having first propellers that rotate about first rotational axes positioned below the fixed wings, wherein the first propellers are mounted fore of the fixed wings, and wherein three or more of the distributed propulsion units are mounted to each of the fixed wings; and
    bulkhead ribs mounted to and encircling the center structural tube at a plurality of different locations along the fore-to-aft longitudinal axis, wherein the center structural tube comprises a single tube that is the primary structural member of the UAV and extends from the tail assembly to fore of the fixed wings.

14. The UAV of claim 13, wherein the fuselage further comprises:
    a fuselage skin disposed around the bulkhead ribs.

15. The UAV of claim 13, further comprising:
    a plurality of tail propulsion units having second propellers that rotate about second rotational axes each positioned inline with one of the stabilizers, wherein the second propellers are mounted fore of a corresponding one of the stabilizers.

16. The UAV of claim 15, wherein the tail assembly includes a pair of horizontal stabilizers, and wherein the plurality of tail propulsion units includes horizontal tail propulsion units each mounted to a corresponding one of the horizontal stabilizers, wherein the second propellers of the horizontal tail propulsion units do not extend out horizontally past distal tips of the horizontal stabilizers.

17. The UAV of claim 16, wherein the horizontal tail propulsion units are each mounted in front of a corresponding elevator to blow air across the corresponding elevator.

18. The UAV of claim 16, wherein the horizontal tail propulsion units are mounted to elevators of the horizontal stabilizers and pivot with the elevators to provide vertical thrust vectoring to the tail assembly.

19. The UAV of claim 15, wherein the tail assembly includes a vertical stabilizer, and wherein the plurality of tail propulsion units includes a vertical tail propulsion unit mounted to the vertical stabilizer, wherein one of the second propellers of the vertical tail propulsion unit does not extend out vertically past a distal tip of the vertical stabilizer.

20. The UAV of claim 13, further comprising:
a pair of outboard propulsion units each mounted to a corresponding one of the fixed wings outboard of the distributed propulsion units, wherein the outboard propulsion units include outboard propellers having a larger diameter than the first propellers of the distributed propulsion units.

21. The UAV of claim 20, wherein the first propellers of at least a portion of the distributed propulsion units include hinged propeller blades that passively fold back to reduce wind resistance when the portion of the distributed propulsion units is idled during a forward cruise of the UAV under power of the outboard propulsion units.

22. The UAV of claim 13, wherein distal tips of the first propellers of the distributed propulsion units trace out a circle having an upper limit that is inline with the fixed wings and wherein the distributed propulsion units include motor mounts that align the first propellers with a zero cant such that the first rotational axes are each parallel to a corresponding wing chord extending from a leading edge of a corresponding one of the fixed wings to a trailing edge of the corresponding one of the fixed wings.

23. The UAV of claim 13, further comprising:
landing gear mounted to the center structural tube fore of the fixed wings, wherein the center structure tube is a single tube that extends from the tail assembly to fore of both of the landing gear and the fixed wings.

* * * * *